Figure 1:
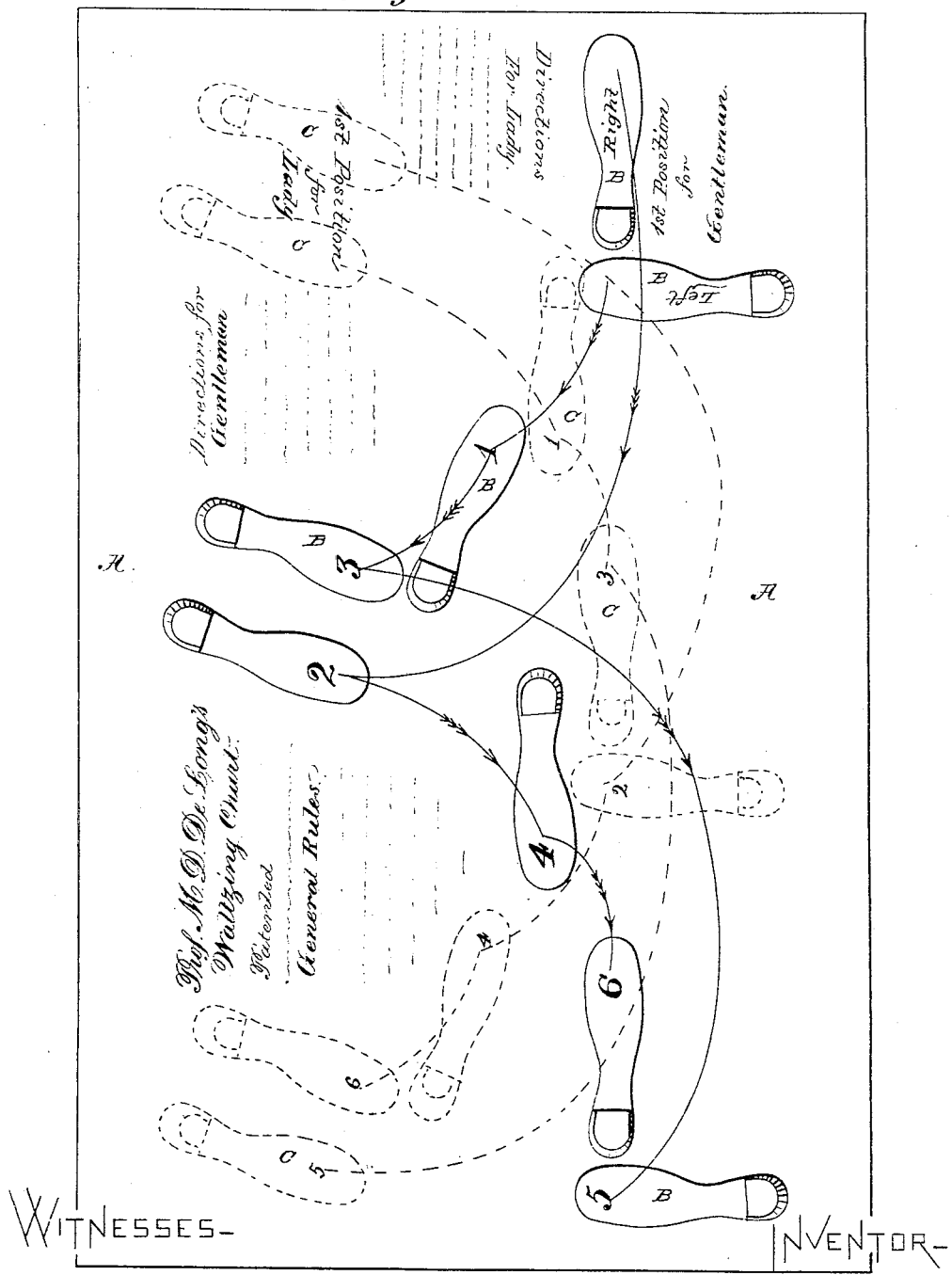

(No Model.) 2 Sheets—Sheet 1.

M. D. De LONG.
Appliance for Self Instruction in Dancing.

No. 233,482. Patented Oct. 19, 1880.

Witnesses—
F. B. Townsend
W. D. Adams

Inventor—
M. D. DeLong
per W. E. Dayton
Attorney

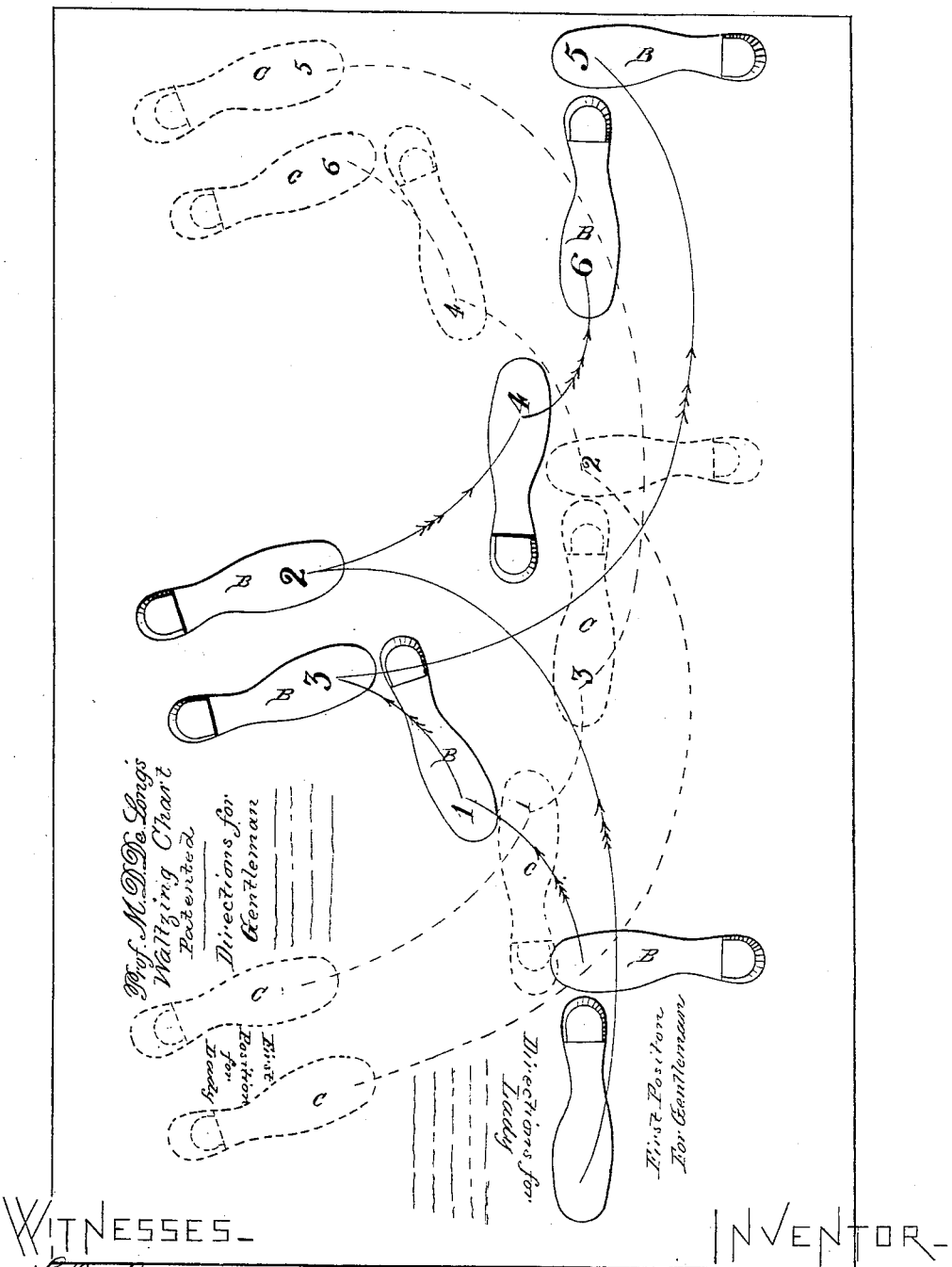

UNITED STATES PATENT OFFICE.

M. DAVID DE LONG, OF CHICAGO, ILLINOIS.

APPLIANCE FOR SELF-INSTRUCTION IN DANCING.

SPECIFICATION forming part of Letters Patent No. 233,482, dated October 19, 1880.

Application filed August 23, 1880. (No model.)

*To all whom it may concern:*

Be it known that I, M. DAVID DE LONG, of Chicago, in the county of Cook and State of Illinois, have invented certain new and useful Improvements in Appliances for Self-Instruction in Dancing; and I do hereby declare that the following is a full, clear, and exact description thereof, reference being had to the accompanying drawings, and to the letters of reference marked thereon, which form a part of this specification.

My invention relates to appliances for self-instruction in dancing.

It consists in what may be called a "chart," (the same being a heavy sheet of paper or other suitable material,) having delineated thereon, in substantially full size, the positions of the feet successively taken in performing a complete figure of a dance.

It also consists in combining with delineations of the foot positions upon a chart, as described, lines showing the proper course to be taken by the feet in their passage from one position to another, with or without printed instructions upon the face of the sheet.

It further consists in combining numerals with the representations of the foot positions, which numerals indicate the order of the steps or foot movements to be made in performing the figure, with or without the connecting-lines above mentioned.

In the drawings, Figure 1 represents the chart having the foot positions of a waltz figure indicated thereon by means of images of the foot-soles, the same being arranged in their natural or direct order for both lady and gentleman. Fig. 2 shows the positions in their reverse order. The full lines indicate the positions and movements for the gentleman and the dotted lines those for the lady.

A is the sheet upon which the delineations are made. It is of such size as to permit the waltz or other dancing figure to completely shown in full size thereon, and is intended to be tacked to the floor, so that the learner may take his place and move about thereon with that free and full sweep of movement called for in actual dancing.

B B are outlines or images of shoe-soles, representing the first, the final, and the several intermediate positions of the feet in a waltz figure as taken by a gentleman.

C C are dotted outlines, correspondingly representing the positions taken successively by a lady. The curved lines extending from one position to another of the same foot indicate the direction in which the foot should be carried in the several successive movements.

The numerals 1, 2, 3, &c., denote the order in which the several positions are taken, starting from the "1st position"—so marked on the chart. Suitable directions are also printed on the chart relative to other matters than the foot positions on the floor, shown as described—such, for example, as the bending of the knees, the turning of the feet in changing the positions, &c. I prefer to print these directions, as indicated, in full view of the learner as he stands in the first position.

By means of a chart printed as described, showing the figure in full size, a lady or gentlemen may privately acquire a perfect knowledge of the steps and movements of a waltz.

Obviously the chart may be used by a lady or gentleman separately, or the chart may contain only the figure for a single person, either the lady or gentleman, and either direct or reverse.

The reverse positions (shown in Fig. 2) I propose to print on the opposite side of the same sheet.

The curved lines and the numerals need not both be present, but are both desirable. The right and left form of the shoe-sole representations will also aid the eye of the learner materially in his or her movements upon the chart.

Having thus described my invention, I claim—

1. A chart representing the several positions successively taken by the feet in performing a figure of a dance, of size adapted to form an actual guide to the learner, stepping from one postion to another thereon.

2. In the chart described, representing the several successive positions of the feet in a waltz or other dance, the combination, with the images denoting the foot positions, of curved lines indicating the succession of said positions, and also the direction taken by the feet in changing from one poistion to another, substantially as described.

3. In the chart described, the combination, with the images denoting the several positions taken successively by the feet in a dance-figure, of numerals applied to the several positions to indicate their order, with or without lines connecting the several positions of the same foot, substantially as described, and for the purposes set forth.

In testimony that I claim the foregoing as my invention I affix my signature in presence of two witnesses.

M. DAVID DE LONG.

Witnesses:
M. E. DAYTON,
JESSE COX, Jr.